(12) United States Patent
Shibasaki

(10) Patent No.: US 7,513,421 B2
(45) Date of Patent: *Apr. 7, 2009

(54) TRANSACTION TERMINAL DEVICE AND TRANSACTION TERMINAL CONTROL METHOD

(75) Inventor: Tomoki Shibasaki, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/826,462

(22) Filed: Jul. 16, 2007

(65) Prior Publication Data

US 2008/0041933 A1  Feb. 21, 2008

Related U.S. Application Data

(63) Continuation of application No. 11/027,985, filed on Jan. 4, 2005, now Pat. No. 7,293,700.

(51) Int. Cl.
*G06Q 40/00* (2006.01)
(52) U.S. Cl. .................. 235/379; 235/380; 235/492
(58) Field of Classification Search .......... 235/379, 235/380, 383, 492; 705/72, 73
See application file for complete search history.

(56) References Cited

U.S. PATENT DOCUMENTS

| | | | |
|---|---|---|---|
| 4,879,455 A | 11/1989 | Butterworth et al. | |
| 5,601,489 A | 2/1997 | Komaki | |
| 5,714,741 A | 2/1998 | Pieterse et al. | |
| 6,000,607 A | 12/1999 | Ohki et al. | |
| 6,016,956 A * | 1/2000 | Takami et al. | 235/380 |
| 6,021,944 A * | 2/2000 | Arakaki | 235/380 |
| 6,065,679 A | 5/2000 | Levie et al. | |
| 6,070,795 A * | 6/2000 | Feiken | 235/380 |
| 6,097,606 A | 8/2000 | Groves et al. | |
| 6,431,456 B2 | 8/2002 | Nishizawa et al. | |
| 6,776,339 B2 * | 8/2004 | Piikivi | 235/451 |
| 6,871,782 B2 | 3/2005 | Keronen et al. | |
| 2003/0004877 A1 | 1/2003 | Kasasaku | |

FOREIGN PATENT DOCUMENTS

| | | |
|---|---|---|
| EP | 302453 A1 | 2/1989 |
| JP | 2000-242750 | 9/2000 |
| JP | 2001-118153 | 4/2001 |
| JP | 2002-150247 | 5/2002 |
| JP | 2003-16527 | 1/2003 |

* cited by examiner

*Primary Examiner*—Ahshik Kim
(74) *Attorney, Agent, or Firm*—Staas & Halsey LLP

(57) ABSTRACT

A transaction terminal device executing a customer transaction includes a tamper-proof secured module detachably incorporated in a main unit, and an unsecured module that is not tamper-proof and is embedded in the main unit. The secured module notifies secure information to a user, obtains customer related unique information required for executing the customer transaction, encrypts the unique information obtained, and sends the encrypted unique information to the unsecured module. The unsecured module executes the customer transaction using the encrypted unique information.

8 Claims, 14 Drawing Sheets

TRANSACTION TERMINAL DEVICE AND TRANSACTION TERMINAL CONTROL METHOD

CROSS REFERENCE TO RELATED APPLICATION

This application is a Continuation Application of application Ser. No. 11/027,985, filed Jan. 4, 2005, now U.S. Pat. No. 7,293,700, and incorporated by reference herein.

BACKGROUND OF THE INVENTION

1) Field of the Invention

The present invention relates to a transaction terminal device and a transaction terminal control method that enable a user to enter unique information such as a PIN in a secure environment, and that enhance versatility and scalability of the transaction terminal device.

2) Description of the Related Art

Conventionally, a transaction terminal device that is used in settlement of accounts by credit cards, IC (Integrated Circuit) cards, and automated teller machine (ATM) cards is well known.

FIG. 14 is a block diagram of a conventional transaction terminal device 10. The transaction terminal device 10 is a handy terminal operated by a salesperson, and is used in settlement of accounts by various cards such as credit cards, IC cards, ATM cards, and the like.

The transaction terminal device 10 includes a CPU (Central Processing Unit) 11, a ROM (Read Only Memory) 12, a RAM (Random Access Memory) 13, a display 14, a keyboard 15, a card reader 16, and a line connector 17. The CPU 11 executes application programs such as a settlement of accounts application program and an encryption program, and controls the settlement of accounts and encryption process. The ROM 12 stores the settlement of accounts application program, the encryption program, and the like.

The RAM 13 stores data temporarily. The display 14, for instance, is a liquid crystal display that displays a settlement of accounts screen, and the like. The keyboard 15 includes a group of keys (0 to 9 keys and symbol keys) that enables a user such as a salesperson or a customer to enter a unique PIN (Personal Identification Number) information such as a security code, a personal identification number, and the like.

The card reader 16 reads card information such as a card number, and the like, from a card 20 that is used for the settlement of accounts. The card 20 refers to the credit cards, the IC cards, the ATM cards, and the like.

The line connector 17 sends the PIN information encrypted by the encryption program, to a settlement of accounts server 40 via a communication line 30. The settlement of accounts server 40 is a host computer of a banking corporation or a credit card company that verifies the encrypted and decrypted PIN information.

A credit verification process is performed to gain a permission to settle the accounts. Upon receiving the permission to settle the accounts, the settlement of accounts server 40 sends predetermined response data to the transaction terminal device 10 via the communication line 30. Then, the CPU 11 of the transaction terminal device 10 executes the settlement of accounts application program and the settlement of accounts process (that is, processing of the transaction).

In the transaction terminal device 10, a secured module is formed to prevent unauthorized access to the PIN information entered via the keyboard 15, or the card information read via the card reader 16. The secured module refers to a module having a tamper-proof CPU 11, ROM 12, RAM 13, keyboard 15, and card reader 16.

In the secured module, a wiring that connects all the units is hardened by resin. This mitigates the possibility of signal tapping. Further, if a detector detects an illegal and forceful tapping of the signal, the contents of the ROM 12 and the RAM 13 are destroyed.

However, in the conventional transaction terminal device 10, because all the above-mentioned units including the CPU 11 and the ROM 12 are formed into a secured module, there is a problem in adding a new application program or modifying an existing program. Further, it adversely affects the versatility and scalability of the transaction terminal device.

Moreover, in the conventional transaction terminal device 10, the user (a salesperson or a customer) cannot ensure that he/she can enter the PIN information in a secure environment.

SUMMARY OF THE INVENTION

It is an object of the present invention to at least solve the problems in the conventional technology.

A transaction terminal device according to an aspect of the present invention executes a customer transaction and includes a tamper-proof secured module detachably incorporated in a main unit; an unsecured module that is not tamper-proof and is embedded in the main unit; wherein the secured module includes a secure information notifying unit, an obtaining unit, and an encrypting unit, wherein at the time of obtaining customer related unique information required for executing the customer transaction, the secure information notifying unit notifies secure information to a user, the obtaining unit obtains the unique information, and the encrypting unit encrypts the unique information obtained, and the unsecured module includes a controller that provides control to receive the unique information encrypted, and to execute the customer transaction using the encrypted unique information received.

A transaction terminal control method according to another aspect of the present invention is a method for executing a customer transaction, and applied to a transaction terminal device including a tamper-proof secured module detachably incorporated in a main unit, and an unsecured module that is not tamper-proof and is embedded in the main unit. The transaction terminal control method includes notifying secure information to a user; obtaining customer related unique information required for executing the customer transaction; encrypting the unique information obtained; providing control to send the unique information encrypted to the unsecured module, and to execute the customer transaction using the encrypted unique information received.

The other objects, features, and advantages of the present invention are specifically set forth in or will become apparent from the following detailed description of the invention when read in conjunction with the accompanying drawings.

DETAILED DESCRIPTION

Exemplary embodiments of a transaction terminal device and a transaction terminal control method according to the present invention are explained next with reference to the drawings.

Figure 1:
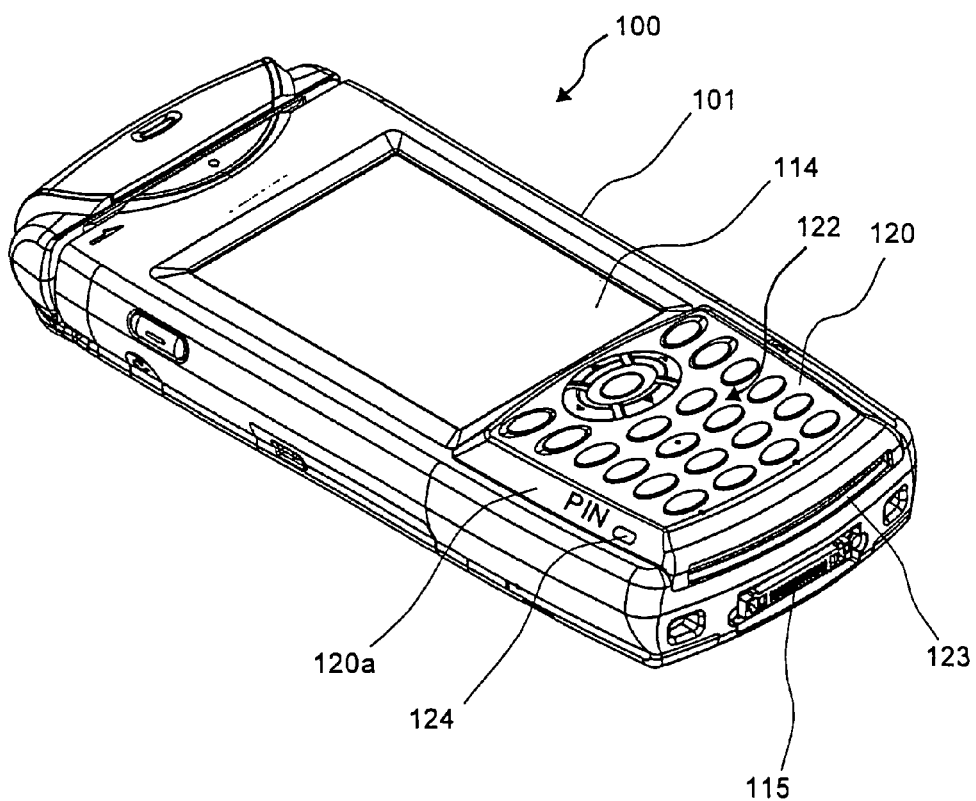
FIG. 1 is a perspective view of an external configuration of a transaction terminal device according to a first embodiment.
Figure 2:
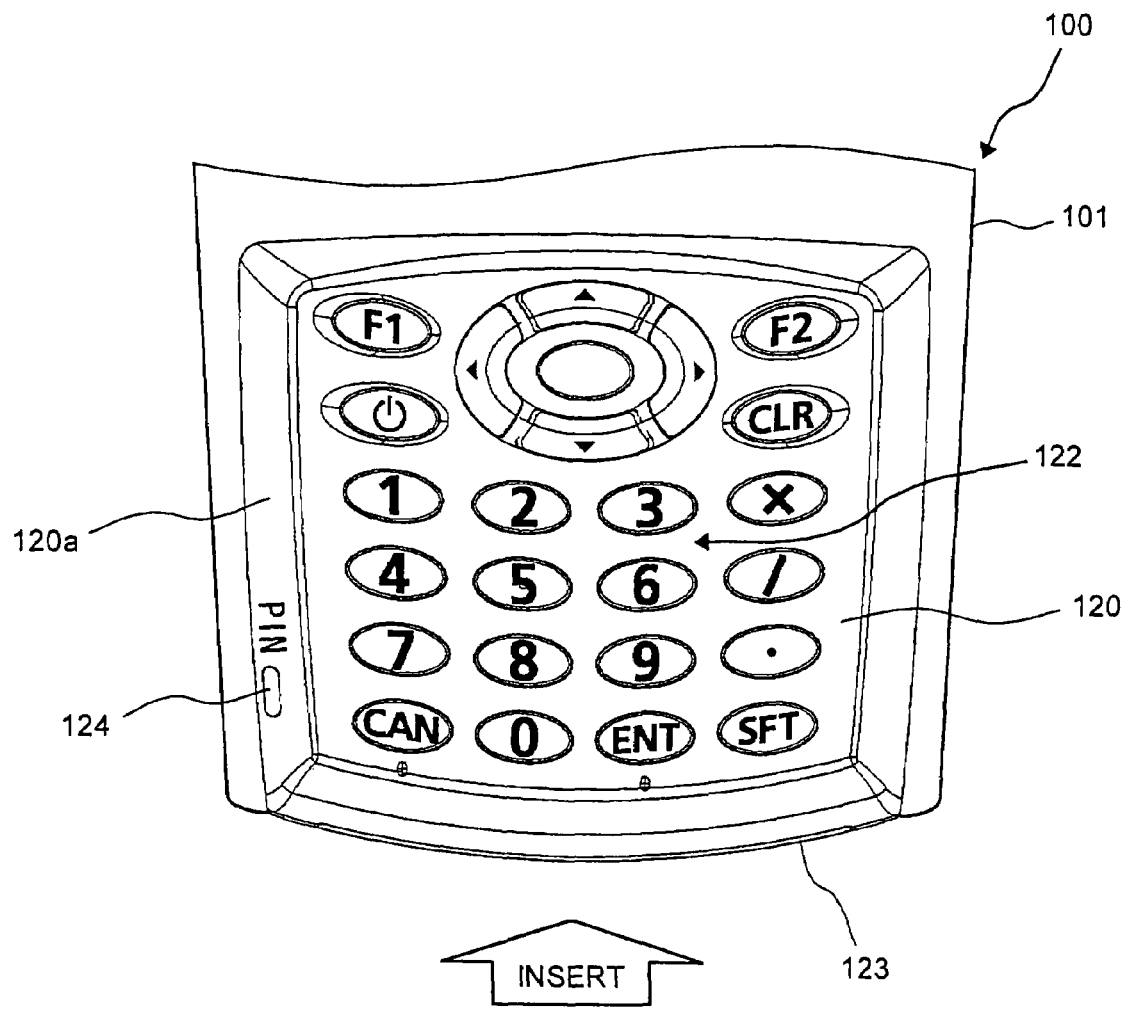
FIG. 2 is a top view of one part of the external configuration of the transaction terminal device according to the first embodiment.
Figure 2:
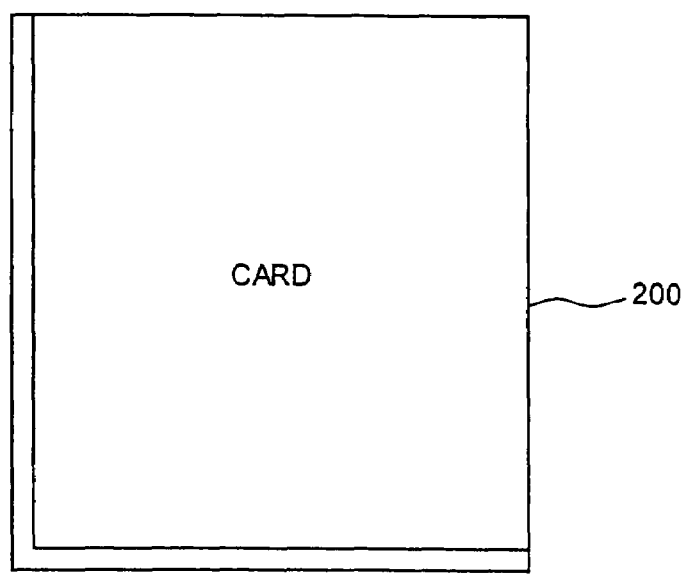
Figure 3:
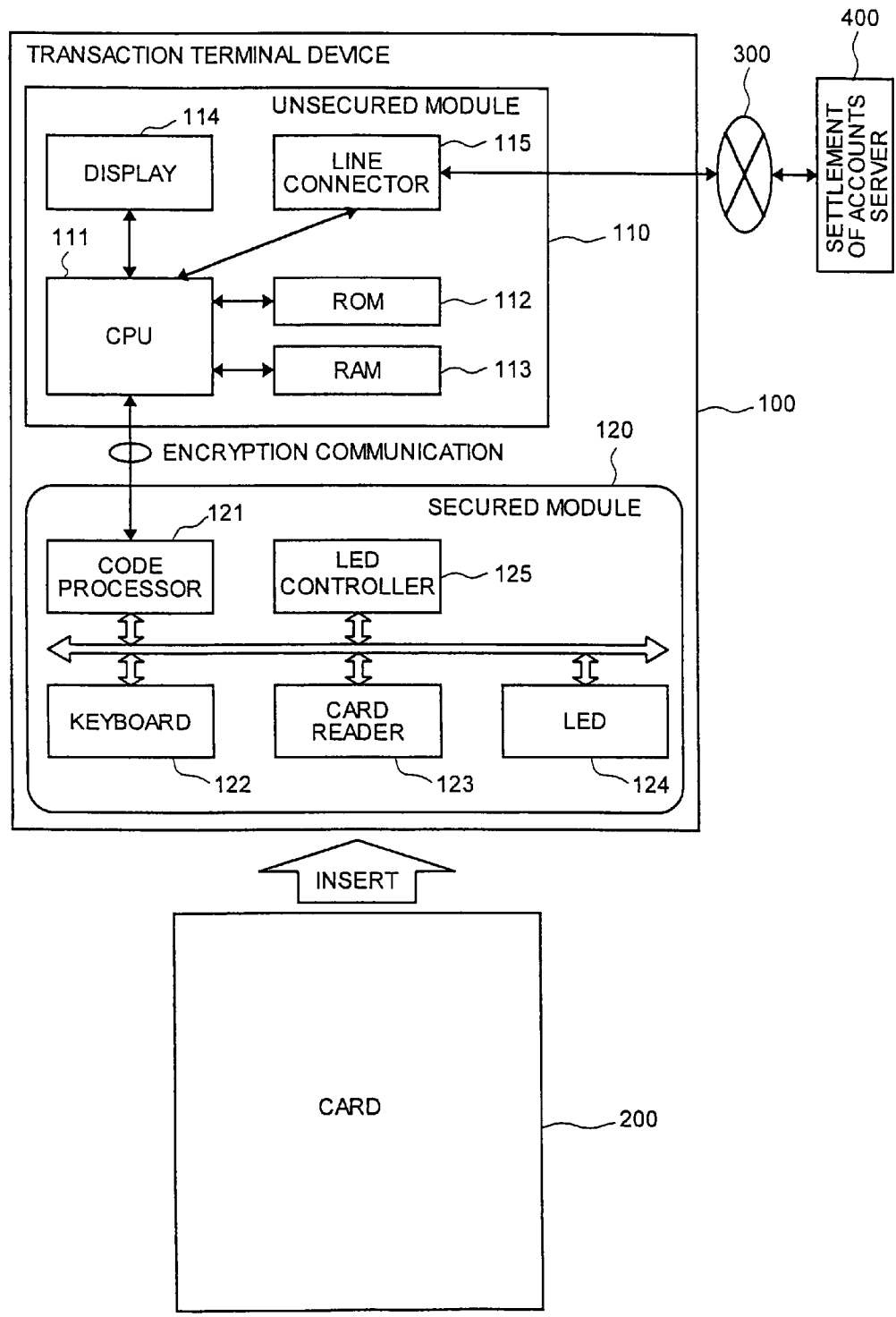
FIG. 3 is a block diagram of an electric configuration of the transaction terminal device according to the first embodiment.

FIG. 1 is a perspective view of an external configuration of a transaction terminal device according to a first embodiment of the present invention. A transaction terminal device 100 represents a handy terminal that is operated by a salesperson. FIG. 2 is a top view of one part of the external configuration of the transaction terminal device according to the first embodiment. FIG. 3 is a block diagram of an electric configuration of the transaction terminal device according to the first embodiment. In FIG. 1 to FIG. 3, the corresponding parts are denoted by the same reference numerals.

In the transaction terminal device 100 shown in FIG. 1 to FIG. 3, some elements that need security are incorporated as a removable secured module 120 in a main unit 101, and the rest of the elements are incorporated as an unsecured module 110 (see FIG. 3) in the main unit 101.

In the unsecured module 110 shown in FIG. 3, an outsider can easily access the information, and a new application program can be added or an existing application program can be updated.

The unsecured module 110 includes a CPU 111, a ROM 112, a RAM 113, a display 114, and a line connector 115. The CPU 111 executes a settlement of accounts application program and an encryption program, and controls the settlement of accounts and encryption process.

The ROM 112 stores therein the settlement of accounts application program, the encryption program, and a normal operation application program. The ROM 112 is an EEPROM (Electrically Erasable Programmable Read-Only Memory) that in which a program or data can be rewritten.

The RAM 113 stores the data temporarily. The display 114, for instance, is a liquid crystal display that displays a settlement of accounts screen, etc.

The line connector 115 sends PIN information to a settlement of accounts server 400, via a communication line 300. The PIN information is unique information such as a security code, a personal identification number, etc., is input by a code processor 121 (described later), and is encrypted by the encryption program. The settlement of accounts server 400 is a host computer of a banking corporation or a credit card company, and verifies the encrypted and decrypted PIN information.

A credit verification process is performed to gain permission to settle the accounts. Upon receiving the permission to settle the accounts, the settlement of accounts server 400 sends predetermined response data to the transaction terminal device 100 via the communication line 300. Then, the CPU 111 in the transaction terminal device 100 executes the settlement of accounts application program and the settlement of accounts process (that is, processes the transaction).

The secured module 120 includes a tamper-proof code processor 121, a keyboard 122, a card reader 123, an LED (Light Emitting Diode) 124, and an LED controller 125.

Accordingly, a wiring that connects all the units in the secured module 120 is hardened by resin, thereby making it almost impossible to tap the signal from the wiring. Further, if a predetermined detector detects an illegal and forceful tapping of the signal, the entire data gets destroyed.

The code processor 121 in the secured module 120 performs encryption communication (encryption/decryption) with the CPU 111 in the unsecured module 110. Thus, a high level of security is ensured to perform encryption communication between the secured module 120 and the unsecured module 110.

The keyboard 122 includes a group of keys (0 to 9 keys and symbol keys) that enables a user to enter the PIN information at the time of settlement of accounts.

The card reader 123 is provided near the secured module 120 shown in FIG. 1. The card reader 123 reads card information such as a card number, etc. from a card 200 shown in FIG. 2. The card 200 is used in settlement of accounts, and refers to the credit cards, the IC cards, the ATM cards, and the like.

The LED 124 is provided on an operating surface 120a of the secured module 120, as shown in FIG. 1. The LED 124 notifies the user (the salesperson or the customer) that he/she can enter the PIN information required for the settlement of accounts, in the secure environment. A LED controller 125 controls the switching ON of the LED 124. "PIN" is printed adjacent to the LED 124 on the operating surface 120a.

The secure environment refers to an environment where illegal readout of the PIN information entered by means of the keyboard 122 from the secured module 120 becomes substantially impossible. The secure environment controls the switching ON of the LED 124 in the secured module 120. Thus, the reliability over the switching ON of the LED 124 is high in the secure environment.

The LED controller 125 performs a security check to determine if there is any abnormality in the secured module 120 at the time of settlement of accounts. If there is no abnormality, the LED controller 125 switches ON the LED 124.

Figure 4:
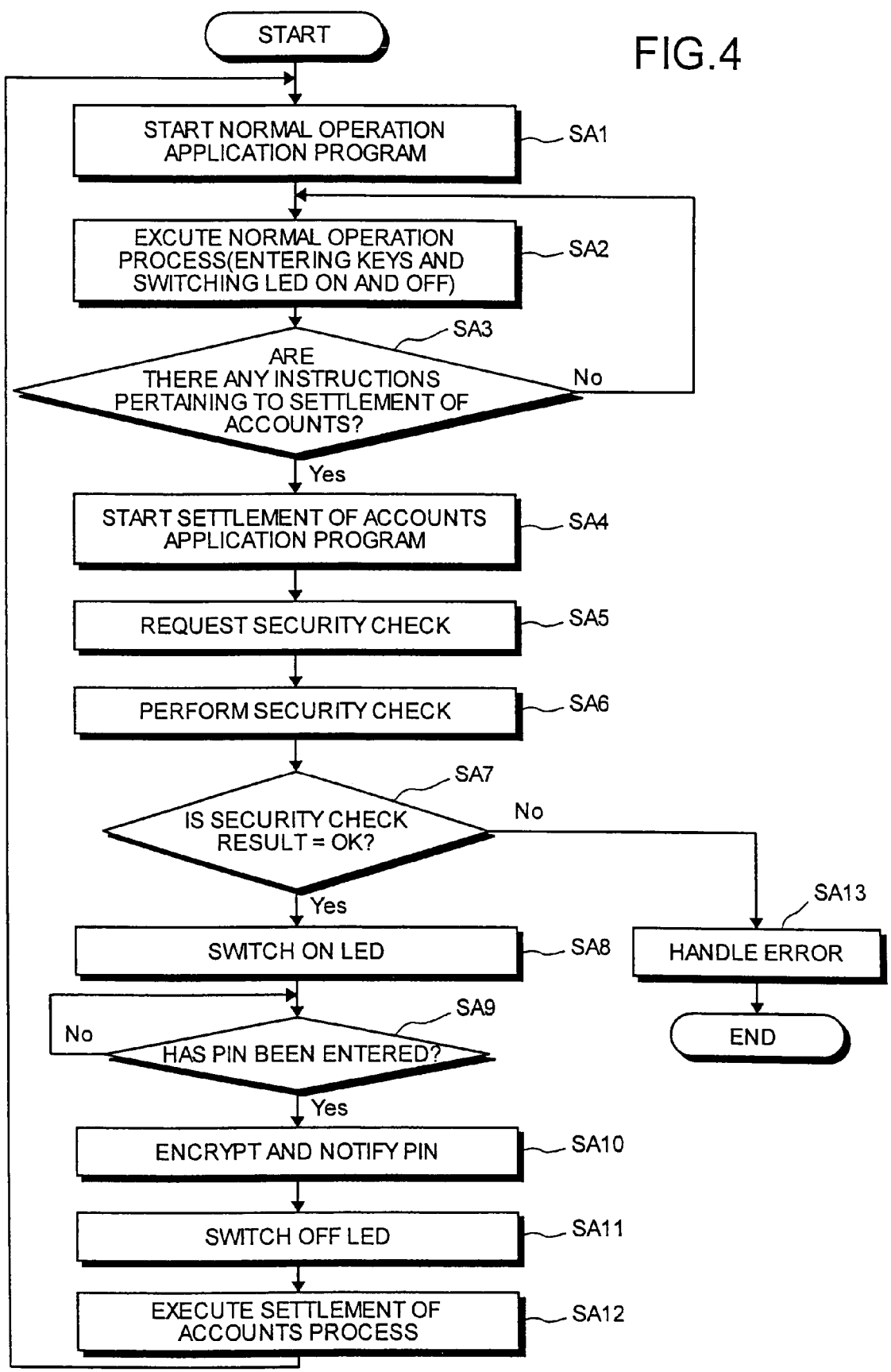
FIG. 4 is a flowchart of an operation of the transaction terminal device according to the first embodiment.

An operation of the transaction terminal device 100 according to the first embodiment is explained next with reference to a flowchart shown in FIG. 4.

At Step SA1, the CPU 111 starts a normal operation application program (for instance, application program for commodity management). At Step SA2, the CPU 111 executes a normal operation process, which includes entering keys and switching the LED ON and OFF, according to the normal operation application program.

At Step SA3, the CPU 111 checks whether the salesperson has given any instructions pertaining to the settlement of accounts by entering predetermined keys of the keyboard 122, and sets the check result to "No". The normal operation process of Step SA2 is repeated till the check result of Step SA3 is set to "Yes".

When a customer, whom the salesperson is dealing with, purchases goods using a card, the salesperson instructs the settlement of accounts by entering the predetermined keys. Thus, upon receiving the instructions to settle the accounts, the CPU 111 sets the check result of Step SA3 to "Yes".

At Step SA4, the CPU 111 starts the settlement of accounts application program stored in the ROM 112. At Step SA5, the CPU 111 sends a security check request to the LED controller 125 of the secured module 120 by way of encryption communication.

At Step SA6, the LED controller 125 checks each unit of the secured module 120 for any abnormality such as breakage, etc. At Step SA7, the LED controller 125 checks whether the security check result is OK (that is, there is no abnormality), and sets the check result to "Yes".

At Step SA8, the LED controller 125 switches ON the LED 124. Upon switching ON the LED 124, the user (the salesperson or the customer) recognizes that the PIN information required for the settlement of accounts can be entered in the secure environment.

At Step SA9, the code processor 121 checks whether the PIN information has been entered using the keyboard 122, sets the check result to "No", and repeats the same check till the check result of Step SA9 is set to "Yes".

Upon receiving the card 200 from the customer, the salesperson inserts the card 200 in the card reader 123 (see FIG. 2), and allows the customer to enter the PIN information using the keyboard 122. On receiving the PIN information, the code processor 121 sets the check result of Step SA9 to "Yes".

At Step SA10, the code processor 121 encrypts the PIN information, and notifies the encrypted PIN information to the CPU 111. The card reader 123 reads the card information from the card 200. The code processor 121 encrypts the card information read, and notifies the encrypted card information to the CPU 111.

At Step SA11, the LED controller 125 switches OFF the LED 124. At Step SA12, based on the PIN information (that is, the card information) notified by the secured module 120, the CPU 111 executes the settlement of accounts process (processing of the transaction) between the settlement of accounts server 400 and the unsecured module 110. Then, the process from Step SA1 onwards is repeated.

Alternatively, if the check result of Step SA7 is "No", that is, if there is some abnormality in the secured module 120, then at Step SA13, the LED controller 125 notifies the CPU 111 that there is an abnormality in the secured module 120. Then, the CPU 111 performs error-handling process, and an error is displayed on the display 114.

Thus, according to the first embodiment, the customer related PIN information (unique information), which is required in the settlement of accounts process in the secured module 120 shown in FIG. 2, is obtained after switching ON the LED 124. The PIN information obtained is then encrypted, and is sent to the unsecured module 110. The transaction with the customer is executed in the unsecured module 110 using the PIN information. Consequently, the security required when obtaining the PIN information is ensured, the user can enter the PIN information in the secure environment, and the versatility and scalability of the transaction terminal device 100 in the unsecured module 110 (see FIG. 3) is enhanced.

An example of the transaction terminal device 100, in which the LED 124 (see FIG. 2) is switched ON to notify the user (the salesperson or the customer) that the PIN information can be entered in the secure environment, is explained in the first embodiment. However, the transaction terminal device 100 may be configured in such a way that the secure information is displayed on a display 511 (see FIG. 5) instead of switching ON the LED 124. The configuration example in which the secure information is displayed on the display 511 is explained next as a second embodiment of the present invention.

Figure 5:
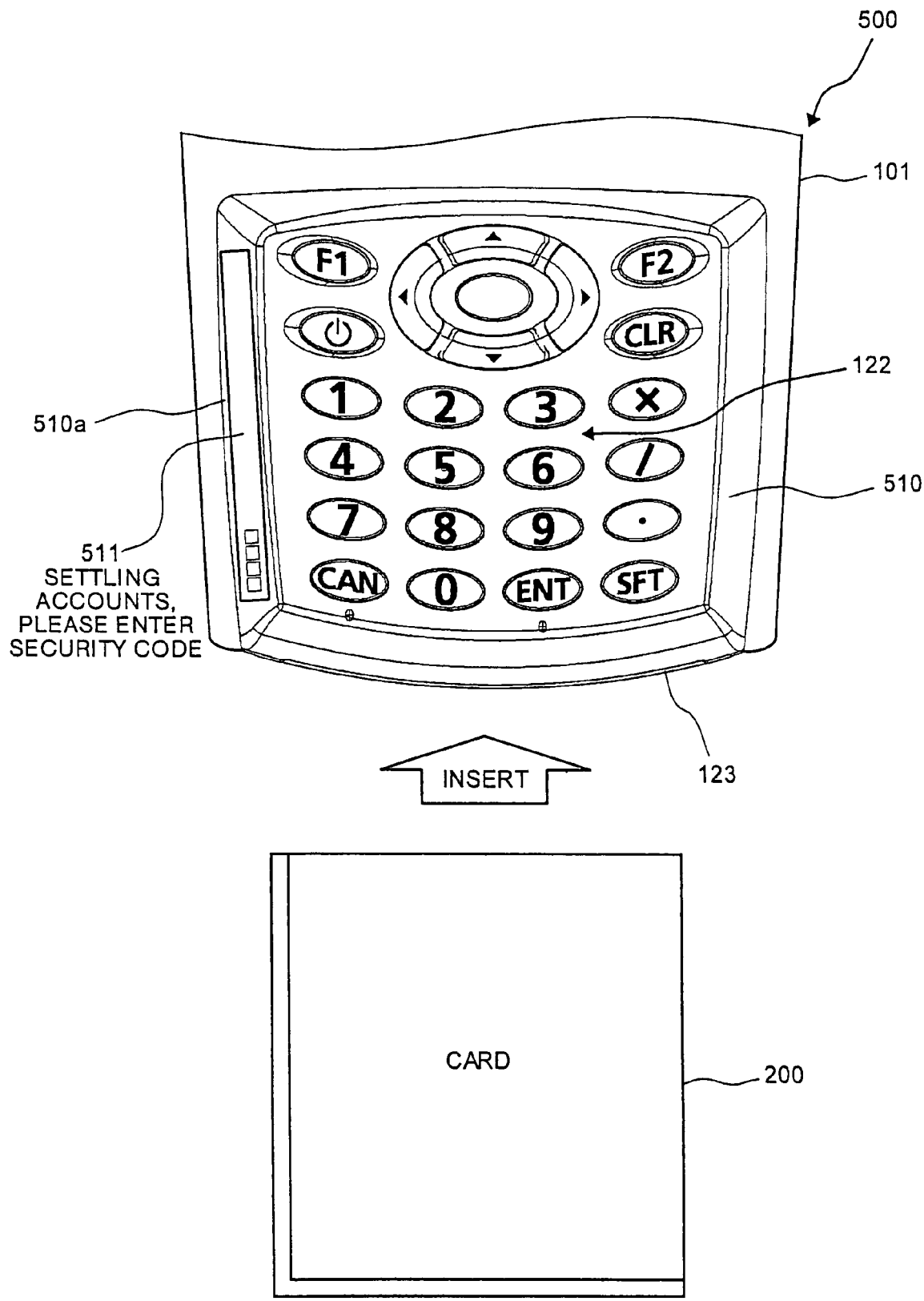
FIG. 5 is a top view of one part of the external configuration of the transaction terminal device according to a second embodiment.
Figure 6:
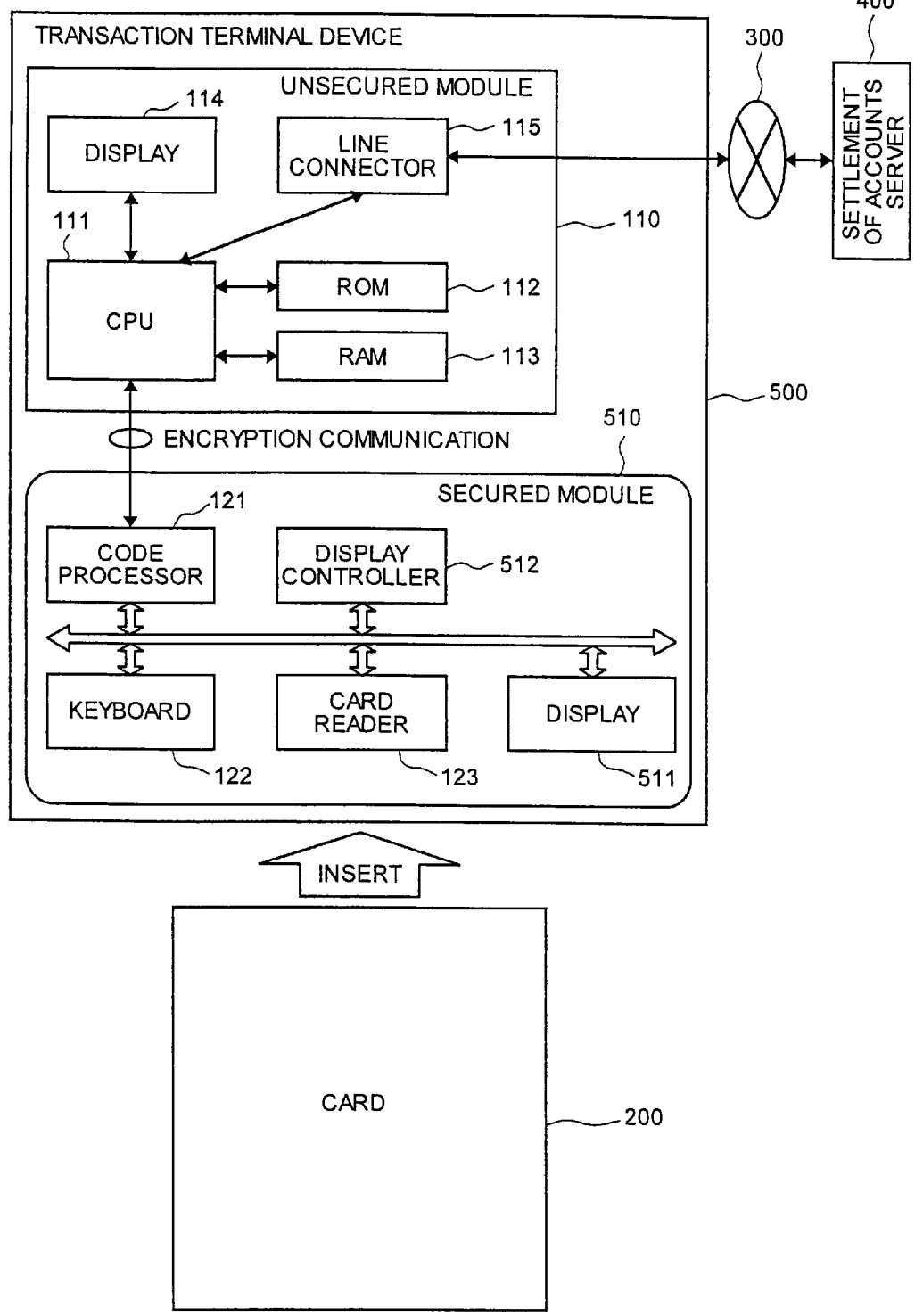
FIG. 6 is a block diagram of an electric configuration of the transaction terminal device according to the second embodiment.

FIG. 5 is a top view of one part of the external configuration of a transaction terminal device according to the second embodiment. FIG. 6 is a block diagram of the electric configuration of the transaction terminal device according to the second embodiment. In FIG. 5 and FIG. 6, the parts corresponding to FIG. 2 and FIG. 3 are denoted by the same reference numerals.

In a transaction terminal device 500 shown in FIG. 5, a secured module 510 is provided instead of the secured module 120 shown in FIG. 2. In the secured module 510, the display 511 is provided instead of the LED 124 shown in FIG. 2.

In the transaction terminal device 500 shown in FIG. 6, the secured module 510 is provided instead of the secured module 120 shown in FIG. 2. In the secured module 510, the display 511 and a display controller 512 are provided instead of the LED 124 and the LED controller 125 shown in FIG. 3.

The display 511 is a liquid crystal display provided on an operating surface 510a shown in FIG. 5. The display 511 notifies the user (the salesperson or the customer) that the PIN information required in the settlement of accounts can be entered in the secure environment, and displays the secure information ("Settling the accounts, please enter security code in specific area.") at the time of settlement of accounts.

The secure environment refers to an environment where illegal readout of the PIN information entered by means of the keyboard 122 from the secured module 510 becomes substantially impossible. The secure environment controls the display of the display 511 in the secured module 510. Thus, the reliability over the display of the secure information is high in the secure environment.

The display controller 512 performs a security check to determine if there is any abnormality in the secured module 510 at the time of settlement of accounts. If there is no abnormality, the display controller 512 displays the secure information on the display 511 (see FIG. 5).

Figure 7:
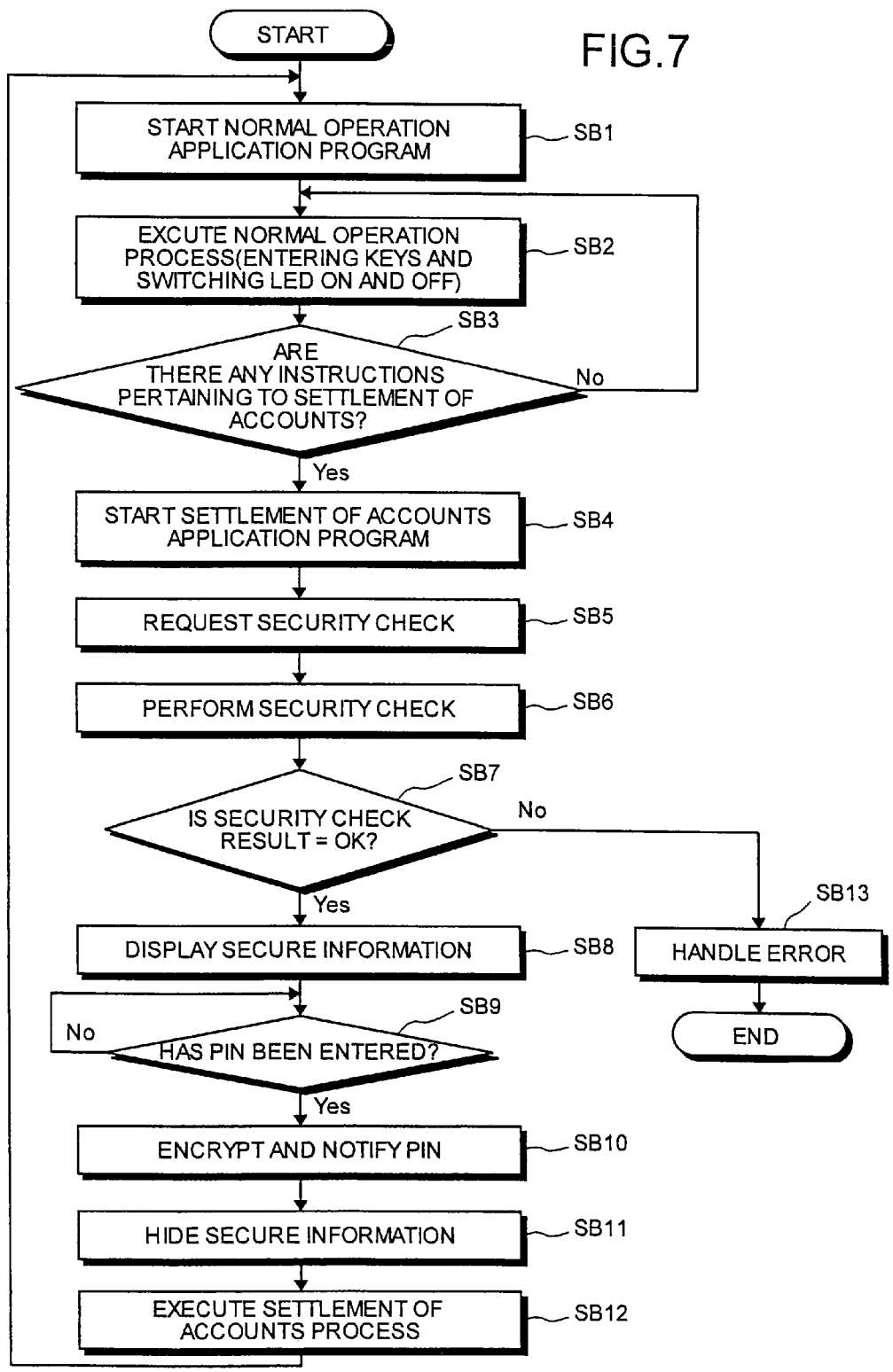
FIG. 7 is a flowchart of an operation of the transaction terminal device according to the second embodiment.

An operation of the transaction terminal device 500 according to the second embodiment is explained next with reference to the flowchart shown in FIG. 7.

At Step SB1, same as in Step SA1 (see FIG. 4), the CPU 111 starts the normal operation application program. Steps SB2 to SB4 are executed same as Steps SA2 to SA4 (see FIG. 4).

At Step SB5, the CPU 111 sends a security check request to the display controller 512 of the secured module 510 by way of encryption communication.

At Step SB6, the display controller 512 checks each unit of the secured module 510 for any abnormality such as breakage, etc. At Step SB7, the display controller 512 checks whether the security check result is OK (that is, there is no abnormality), and sets the check result to "Yes".

At Step SB8, the display controller 512 displays the secure information ("Settling the accounts, please enter security code in specific area.") on the display 511 (see FIG. 5). On displaying the secure information on the display 511, the user (the salesperson or the customer) recognizes that the PIN information required in the settlement of accounts can be entered in the secure environment.

At Step SB9, the code processor 121 checks whether the PIN information has been entered using the keyboard 122, sets the check result to "No", and repeats the same check till the check result of Step SB9 is set to "Yes".

Upon receiving the card 200 from the customer, the salesperson inserts the card 200 in the card reader 123 (see FIG. 5), and allows the customer to enter the PIN information using the keyboard 122. On receiving the PIN information, the code processor 121 sets the check result of Step SB9 to "Yes".

At Step SB10, the code processor 121 encrypts the PIN information, and notifies the encrypted PIN information to the CPU 111. The card reader 123 reads the card information from the card 200. The code processor 121 encrypts the card information read, and notifies the encrypted card information to the CPU 111.

At Step SB11, the display controller 512 hides the secure information of the display 511. At Step SB12, based on the PIN information (that is, the card information) notified by the secured module 510, the CPU 111 executes the settlement of accounts process (processing of the transaction) between the settlement of accounts server 400 and the unsecured module 110. Then, the process from Step SB1 onwards is repeated.

Alternatively, if the check result of Step SB7 is "No", that is, if there is some abnormality in the secured module 510, then at Step SB13, the display controller 512 notifies the CPU 111 that there is an abnormality in the secured module 510. Then, the CPU 111 performs the error-handling process.

Thus, according to the second embodiment, the secure information is displayed on the display 511 provided on the secured module 510 shown in FIG. 5, and hence, the security required when obtaining the PIN information is ensured, the user can enter the PIN information in the secure environment, and the versatility and scalability of the transaction terminal device 500 in the unsecured module 110 (see FIG. 6) is enhanced.

An example of the transaction terminal device 100, in which the LED 124 (see FIG. 2) is switched ON to notify the user (the salesperson or the customer) that the PIN information can be entered in the secure environment, is explained in the first embodiment. However, the transaction terminal device 100 may be configured in such a way that an audio guidance related to the secure information is notified to the user by means of a speaker 611 (see FIG. 8) instead of switching on the LED 124. The configuration example in which the audio guidance is notified to the user using the speaker 611 is explained next as a third embodiment.

Figure 8:
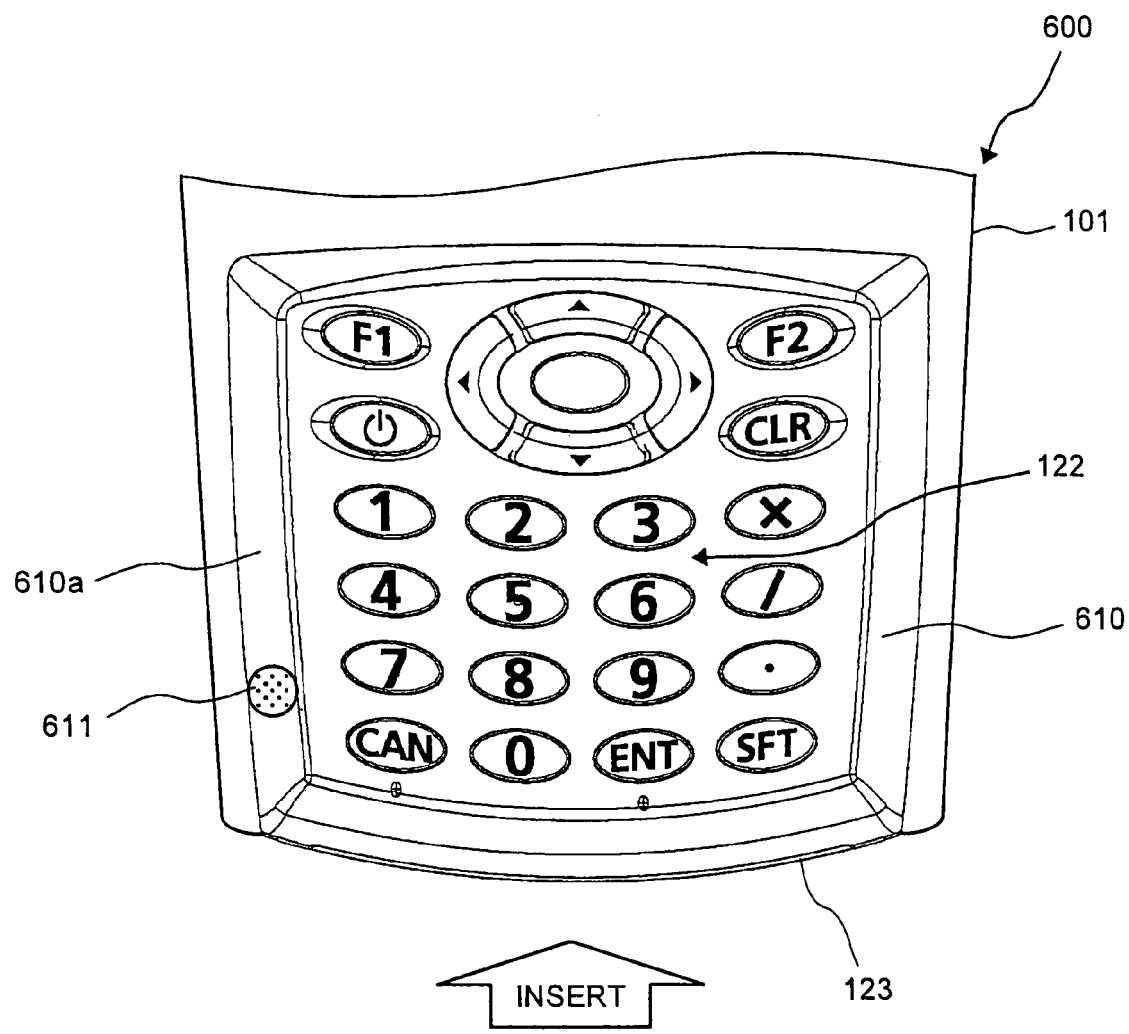
FIG. 8 is a top view of one part of the external configuration of the transaction terminal device according to a third embodiment.
Figure 8:
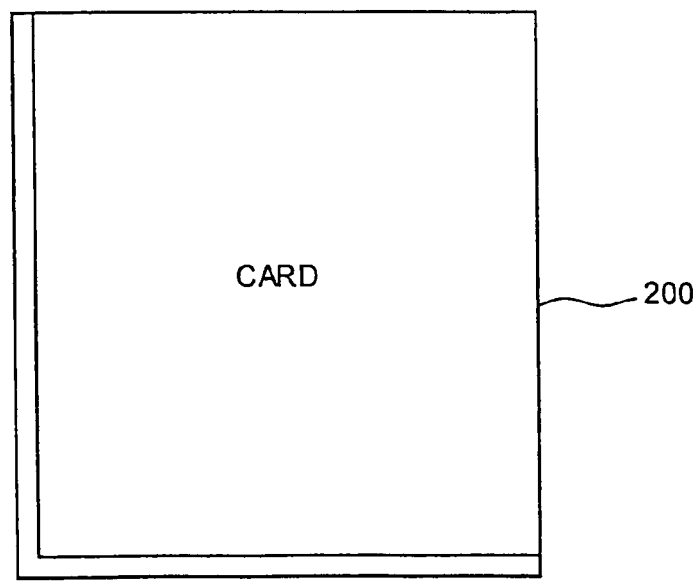
Figure 9:
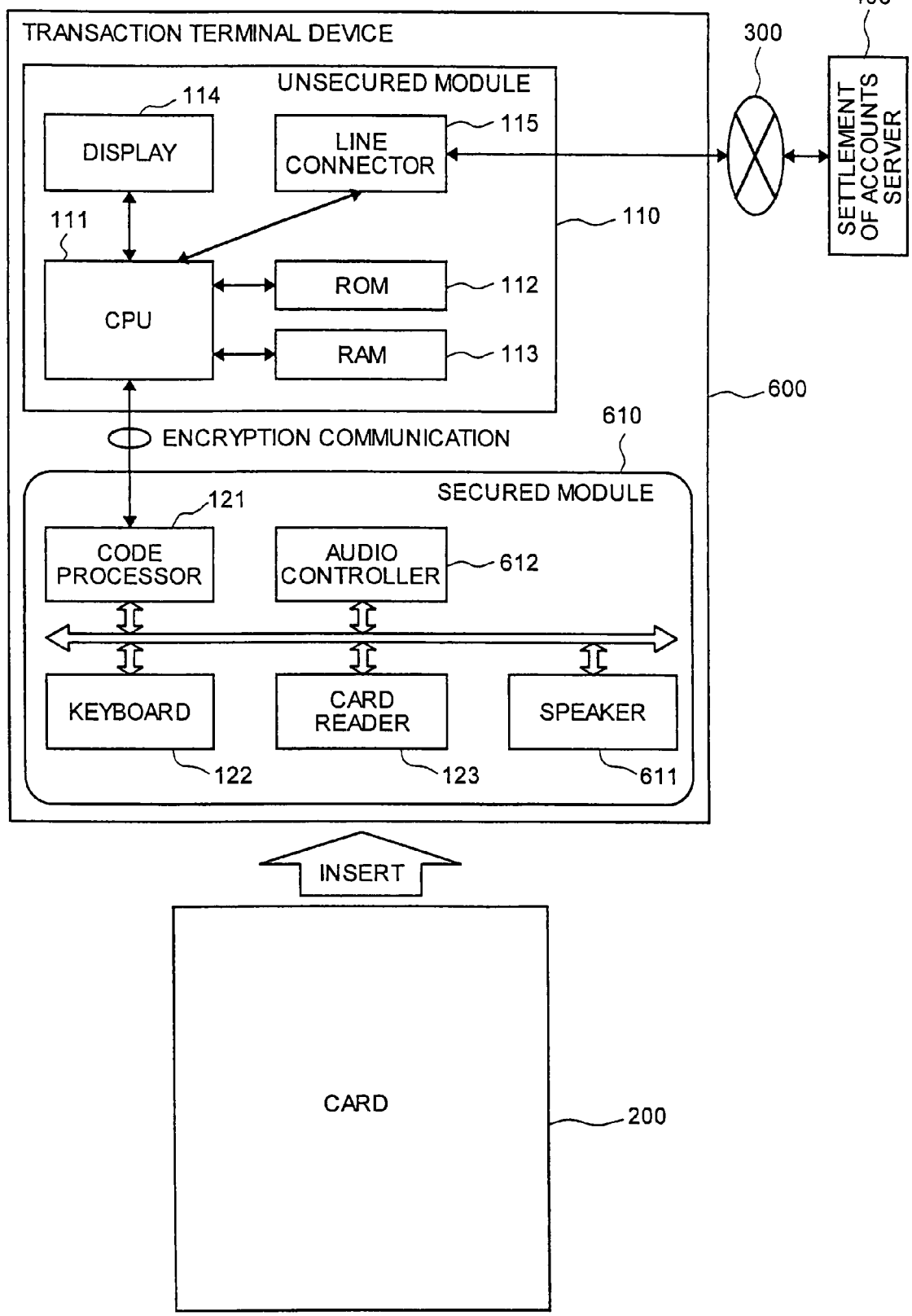
FIG. 9 is a block diagram of an electric configuration of the transaction terminal device according to the third embodiment.

FIG. 8 is a top view of one part of the external configuration of a transaction terminal device according to the third embodiment. FIG. 9 is a block diagram of the electric configuration of the transaction terminal device according to the third embodiment. In FIG. 8 and FIG. 9, the parts corresponding to FIG. 2 and FIG. 3 are denoted by the same reference numerals.

In a transaction terminal device 600 shown in FIG. 8, a secured module 610 is provided instead of the secured module 120 shown in FIG. 2. In the secured module 610, the speaker 611 is provided instead of the LED 124 shown in FIG. 2.

In a transaction terminal device 600 shown in FIG. 9, the secured module 610 is provided instead of the secured module 120 shown in FIG. 2. In the secured module 610, the speaker 611 and an audio controller 612 are provided instead of the LED 124 and the LED controller 125 shown in FIG. 3.

The speaker 611 is provided on an operating surface 610a shown in FIG. 8. The speaker 611 notifies the user (the salesperson or the customer) that the PIN information required in the settlement of accounts can be entered in the secure environment, and outputs the secure information ("Settling the accounts. Please enter the security code.") as the audio guidance, at the time of settlement of accounts.

The secure environment refers to an environment where illegal readout of the PIN information entered by means of the keyboard 122 from the secured module 610 becomes substantially impossible. The secure environment controls the audio of the speaker 611 in the secured module 610. Thus, the reliability over the secure information (audio guidance) is high in the secure environment.

The audio controller 612 performs a security check to determine if there is any abnormality in the secured module 610 at the time of settlement of accounts. If there is no abnormality, the audio controller 612 outputs the secure information as the audio guidance, via the speaker 611 (see FIG. 8).

Figure 10:
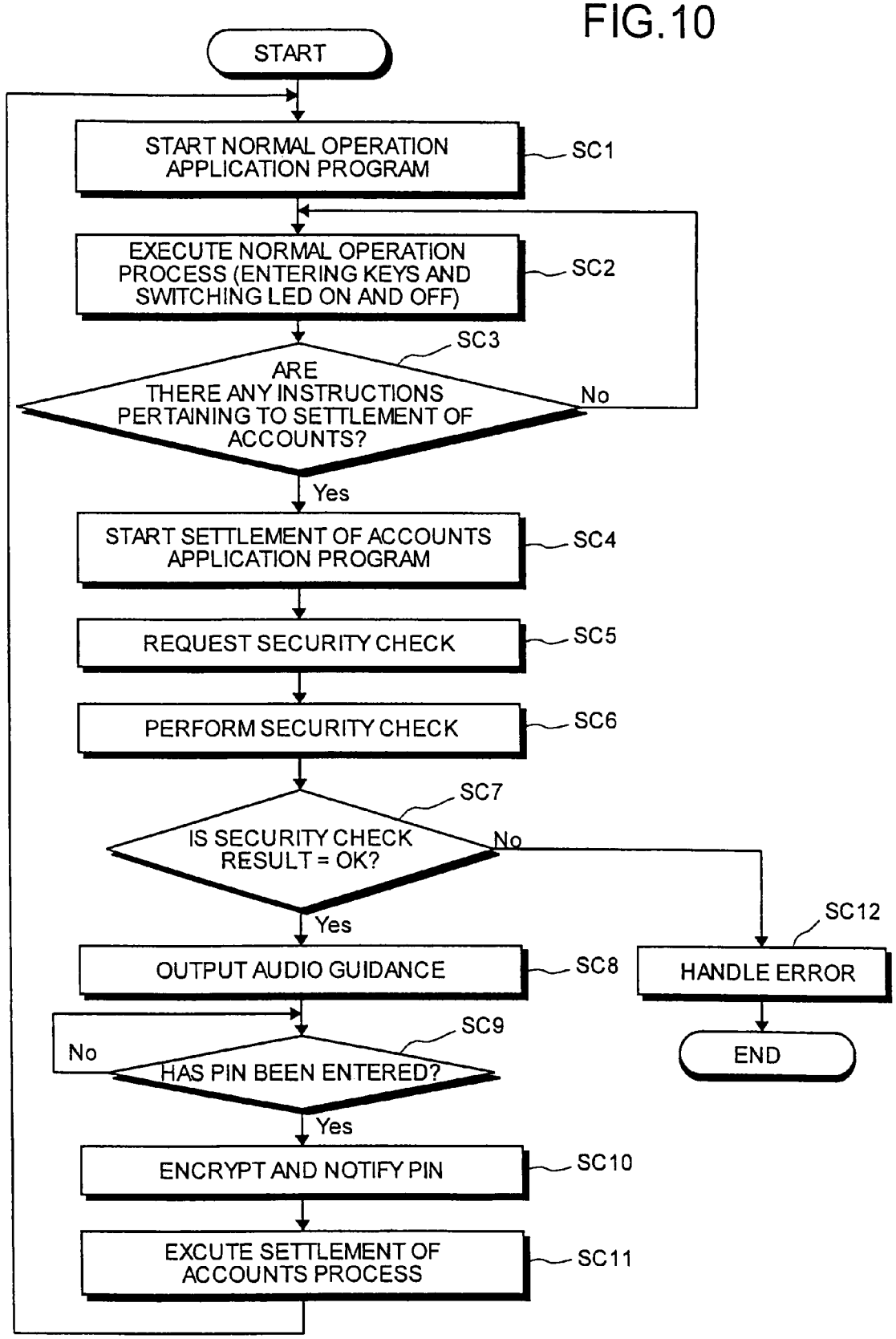
FIG. 10 is a flowchart of an operation of the transaction terminal device according to the third embodiment.

An operation of the transaction terminal device 600 according to the third embodiment is explained next with reference to the flowchart shown in FIG. 10.

At Step SC1, same as the Step SA1 (see FIG. 4), the CPU 111 starts the normal operation application program. Steps SC2 to SC4 are executed same as Steps SA2 to SA4 (see FIG. 4).

At Step SC5, the CPU 111 sends a security check request to the audio controller 612 of the secured module 610 by way of encryption communication.

At Step SC6, the audio controller 612 checks each unit of the secured module 610 for any abnormality such as breakage, etc. At Step SC7, the audio controller 612 checks whether the security check result is OK (that is, there is no abnormality) and sets the check result to "Yes".

At Step SC8, the audio controller 612 outputs the secure information ("Settling the accounts. Please enter the security code.") as the audio guidance, through the speaker 611 (see FIG. 8). On outputting the secure information in the form of audio through the speaker 611, the user (the salesperson or the customer) recognizes that the PIN information required in the settlement of accounts can be entered in the secure environment.

At Step SC9, the code processor 121 checks whether the PIN information has been entered using the keyboard 122, sets the check result to "No", and repeats the same check till the check result of Step SC9 is set to "Yes".

Upon receiving the card 200 from the customer, the salesperson inserts the card 200 in the card reader 123 (see FIG. 8) and allows the customer to enter the PIN information using the keyboard 122. On receiving the PIN information, the code processor 121 sets the check result of Step SC9 to "Yes".

At Step SC10, the code processor 121 encrypts the PIN information, and notifies the encrypted PIN information to the CPU 111. The card reader 123 reads the card information from the card 200. The code processor 121 encrypts the card information read, and notifies the encrypted card information to the CPU 111. At Step SC11, based on the PIN information (that is, the card information) notified by the secured module 610, the CPU 111 executes the settlement of accounts process (processing of the transaction) between the settlement of accounts server 400 and the unsecured module 110. Then, the process from Step SC1 onwards is repeated.

Alternatively, if the check result of Step SC7 is "No", that is, if there is some abnormality in the secured module 610, then at Step SC12, the audio controller 612 notifies the CPU 111 that there is an abnormality in the secured module 610. Then, the CPU 111 performs the error-handling process.

Thus, according to the third embodiment, the secure information is output as the audio guidance from the speaker 611 provided in the secured module 610 shown in FIG. 8, and hence, the security required when obtaining the PIN information is ensured, the user can enter the PIN information in the secure environment, and the versatility and scalability of the transaction terminal device 600 in the unsecured module 110 (see FIG. 9) is enhanced.

An example of the transaction terminal device 100, in which the LED 124 (see FIG. 2) provided in the secured module 120 is switched ON to notify the user (the salesperson or the customer) that the PIN information can be entered in the secure environment, is explained in the first embodiment. However, the transaction terminal device 100 may be configured in such a way that the secure information is notified to the user by means of a card LED 803 provided in an IC card 800 (see FIG. 11), instead of the LED 124. The configuration example in which the secure information is notified to the user by means of the card LED 803 is explained next as a fourth embodiment.

Figure 11:
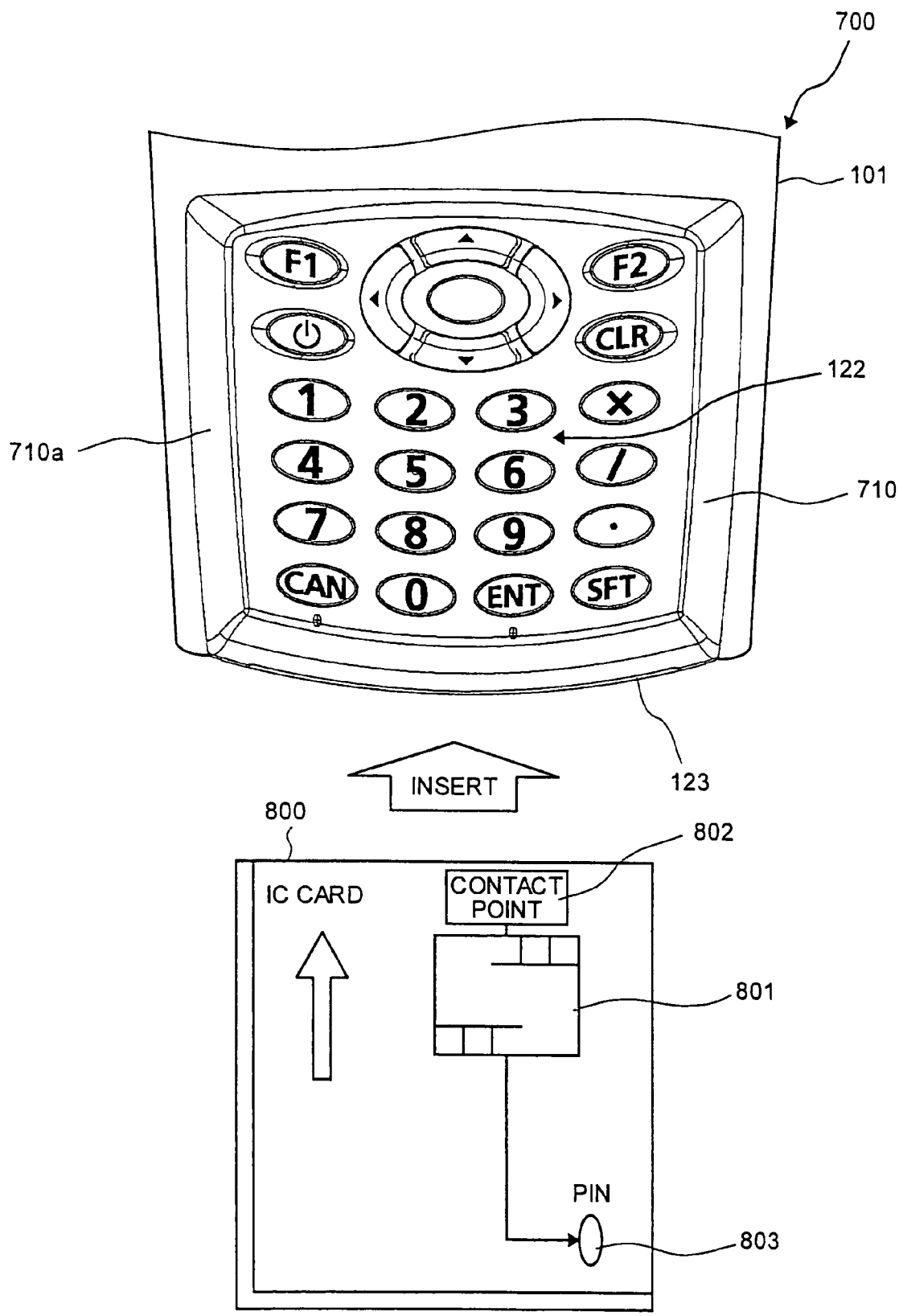
FIG. 11 is a top view of one part of the external configuration of the transaction terminal device according to a fourth embodiment.
Figure 12:
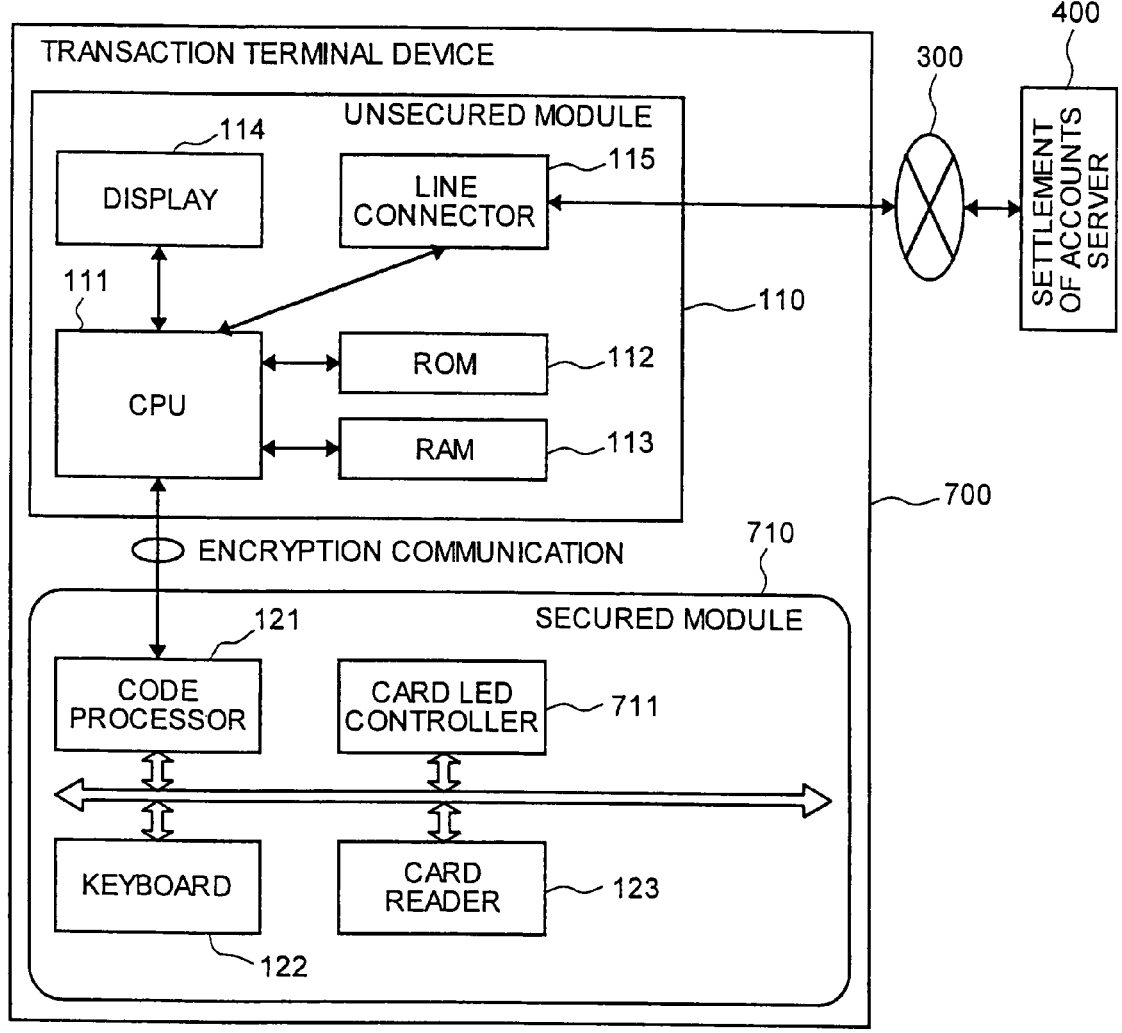
FIG. 12 is a block diagram of the electric configuration of the transaction terminal device according to the fourth embodiment.
Figure 12:
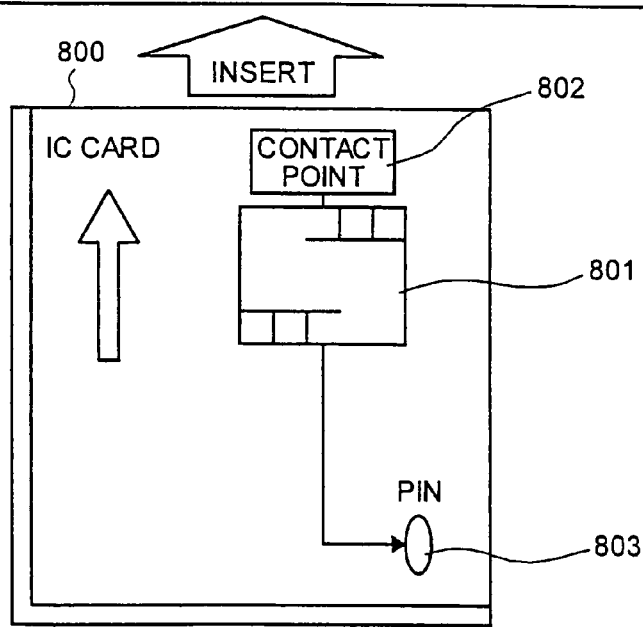

FIG. 11 is a top view of one part of the external configuration of the transaction terminal device according to a fourth embodiment. FIG. 12 is a block diagram of the electric configuration of the transaction terminal device according to the fourth embodiment. In FIG. 11 and FIG. 12, the parts corresponding to FIG. 2 and FIG. 3 are denoted by the same reference numerals.

In a transaction terminal device 700 shown in FIG. 11, a secured module 710 is provided instead of the secured module 120 shown in FIG. 2. An LED equivalent to the LED 124 shown in FIG. 2 is not provided in the secured module 710.

In FIG. 11, the IC card 800 is shown instead of the card 200 shown in FIG. 2. The IC card 800 is used in settlement of accounts, and maintains the card information. The IC card 800 includes an IC 801, a contact point 802, and the card LED 803. The contact point 802 is a terminal that is electrically connected to the card reader 123 (see FIG. 12). The IC 801 stores the card information, and controls every unit of the IC card 800.

The card LED 803 is provided on the surface of the IC card 800, and notifies the user (the salesperson or the customer) that the PIN information required in settlement of accounts can be entered in the secure environment. A card LED controller 711 (described later) controls the switching ON of the card LED 803. "PIN" is printed adjacent to the card LED 803.

The secure environment refers to an environment where illegal readout of the PIN information entered by means of the keyboard 122 from the secured module 710 becomes substantially impossible. The secure environment controls the switching ON of the card LED 803 in the secured module 710. Thus, the reliability over the switching ON of the card LED 803 is high in the secure environment.

In the transaction terminal device 700 shown in FIG. 12, the secured module 710 is provided instead of the secured module 120 shown in FIG. 2. In the secured module 710, the card LED controller 711 is provided instead of the LED 124 and the LED controller 125 shown in FIG. 3.

The card LED controller 711 performs a security check to determine if there is any abnormality in the secured module 710 at the time of settlement of accounts. If there is no abnormality in the secured module 710, the card LED controller 711 switches ON the card LED 803 of the IC card 800 inserted in the card reader 123.

Figure 13:
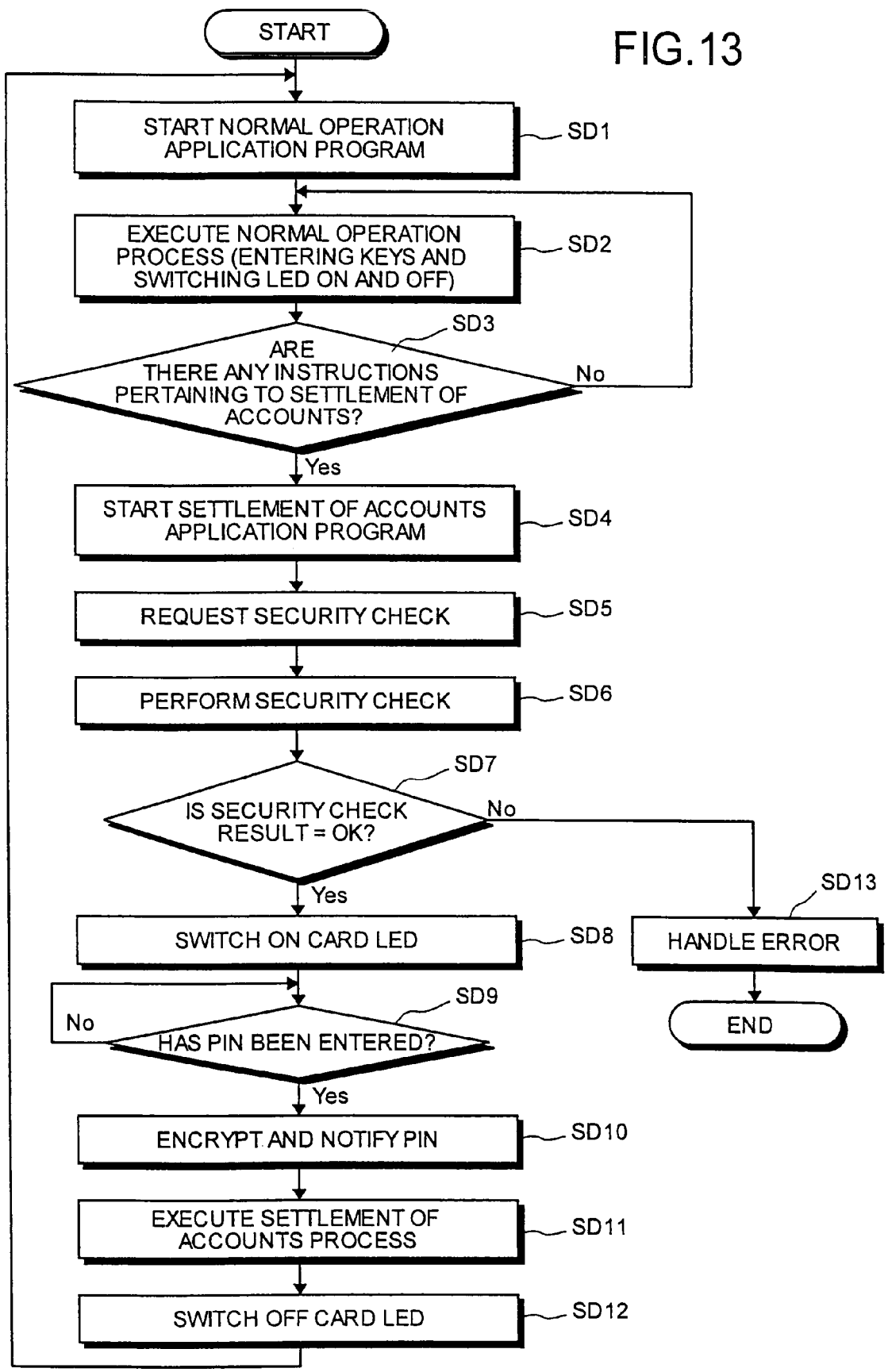
FIG. 13 is a flowchart of an operation of the transaction terminal device according to the fourth embodiment.
Figure 14:
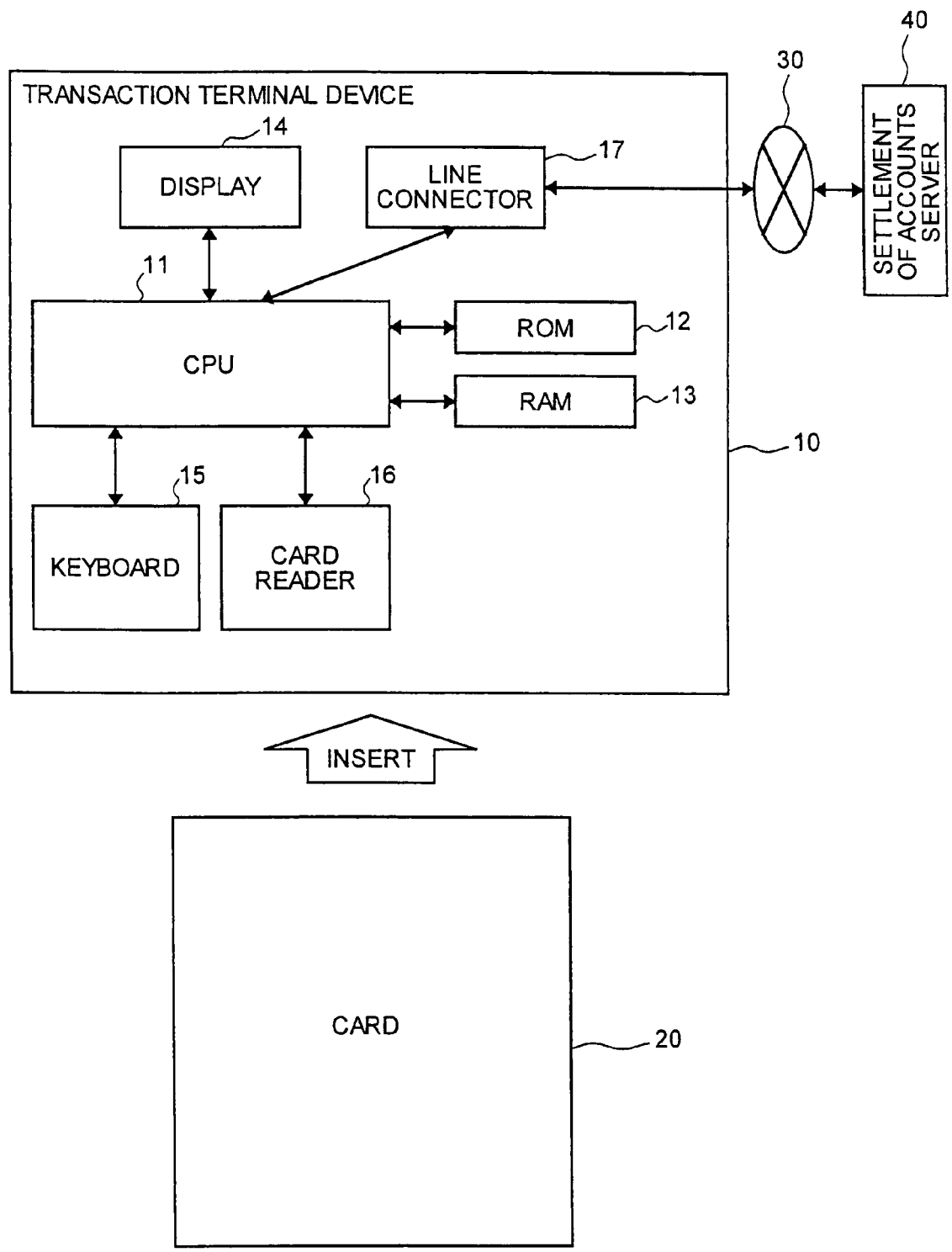
FIG. 14 is a block diagram of an electric configuration of a conventional transaction terminal device.

An operation of the transaction terminal device 700 according to the fourth embodiment is explained next with reference to the flowchart shown in FIG. 13.

At Step SD1, same as in Step SA1 (see FIG. 4), the CPU 111 starts the normal operation application program. Steps SD2 to SD4 are executed same as Steps SA2 to SA4 (see FIG. 4).

At Step SD5, the CPU 111 sends a security check request to the card LED controller 711 of the secured module 710 by way of encryption communication.

At Step SD6, the card LED controller 711 checks each unit of the secured module 710 for any abnormality such as breakage, etc. At Step SD7, the card LED controller 711 checks whether the security check result is OK (that is, there is no abnormality), and sets the check result to "Yes".

Upon receiving the IC card 800 from the customer, the salesperson inserts the IC card 800 in the card reader 123 (see FIG. 11).

At Step SD8, the card LED controller 711 switches ON the card LED 803 via the card reader 123, the contact point 802, and the IC 801. On switching ON the card LED 803, the user (the salesperson or the customer) recognizes that the PIN information required in the settlement of accounts can be entered in the secure environment.

At Step SD9, the code processor 121 checks whether the PIN information has been entered using the keyboard 122, sets the check result to "No", and repeats the same check till the check result of Step SD9 is set to "Yes".

Then, the salesperson allows the customer to enter the PIN information using the keyboard 122. On receiving the PIN information, the code processor 121 sets the check result of Step SD9 to "Yes".

At Step SD10, the code processor 121 encrypts the PIN information, and notifies the encrypted PIN information to the CPU 111. The card reader 123 reads the card information from the IC card 800. The code processor 121 encrypts the card information read, and notifies the encrypted card information to the CPU 111.

At Step SD11, based on the PIN information (that is, the card information) notified by the secured module 710, the CPU 111 executes the settlement of accounts process (processing of the transaction) between the settlement of accounts server 400 and the unsecured module 110. Then, at Step SD12, the card LED controller 711 switches OFF the card LED 803. Then, the process from Step SD1 onwards is repeated.

Alternatively, if the check result of Step SD7 is "No", that is, if there is some abnormality in the secured module 710, then at Step SD13, the card LED controller 711 notifies the CPU 111 that there is an abnormality in the secured module 710. Then, the CPU 111 performs the error-handling process.

Thus, according to the fourth embodiment, the secure information is notified to the user by switching ON the card LED 803 provided in the IC card 800 that is inserted in the card reader 123 shown in FIG. 11, and hence, the security required when obtaining the PIN information is ensured, the user can enter the PIN information in the secure environment, and the versatility and scalability of the transaction terminal device 700 in the unsecured module 110 shown in FIG. 12 is enhanced.

Although the embodiments one to four are described in detail with reference to the drawings, the concrete configuration examples are not restricted to the embodiments one to four, and changes made in the design without departing from the scope of the invention are included in the present invention.

According to the present invention, the customer related unique information, which is required in the processing of the transaction in the secured module, is obtained after notifying the secure information to the user. The unique information obtained is then encrypted, and sent to the unsecured module. The transaction with the customer is executed in the unsecured module using the received unique information. Consequently, the security required when obtaining the unique information is ensured, the user can enter the unique information in the secure environment, and the versatility and scalability of the transaction terminal device in the unsecured module can be enhanced.

According to the present invention, the security when obtaining the unique information is ensured, the user is able to enter the unique information in the secure environment, and the versatility and scalability of the transaction terminal device in the unsecured module is enhanced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A transaction terminal device that executes a customer transaction, comprising:
    a tamper-proof secured module detachably incorporated in a main unit;
    an unsecured module that is not tamper-proof and is embedded in the main unit; wherein
    the secured module includes a secure information notifying unit, an obtaining unit, and an encrypting unit, wherein at the time of obtaining customer related unique information required for executing the customer transaction, the secure information notifying unit notifies secure information to a user, the obtaining unit obtains the unique information, and the encrypting unit encrypts the unique information obtained; and
    the unsecured module includes a controller that provides control to receive the unique information encrypted, and to execute the customer transaction using the encrypted unique information received.

2. The transaction terminal device according to claim 1, wherein at the time of obtaining the unique information, the secure information notifying unit notifies the secure information to the user by switching ON a lighting unit provided in the secured module.

3. The transaction terminal device according to claim 1, wherein at the time of obtaining the unique information, the secure information notifying unit notifies the secure information to the user by displaying the secure information on a display provided in the secured module.

4. The transaction terminal device according to claim 1, wherein at the time of obtaining the unique information, the secure information notifying unit notifies the secure information to the user by outputting the secure information as audio guidance from an audio output unit that is provided in the secured module.

5. A transaction terminal control method for executing a customer transaction, and applied to a transaction terminal device including a tamper-proof secured module detachably incorporated in a main unit, and an unsecured module that is not tamper-proof and is embedded in the main unit, the transaction terminal control method comprising:
    notifying secure information to a user;
    obtaining customer related unique information required for executing the customer transaction;
    encrypting the unique information obtained;
    providing control to send the unique information encrypted to the unsecured module, and to execute the customer transaction using the encrypted unique information received.

6. The transaction terminal control method according to claim 5, wherein at the time of obtaining the unique information, the secure information notifying unit notifies the secure information to the user by switching ON a lighting unit provided in the secured module.

7. The transaction terminal control method according to claim 5, wherein the notifying includes notifying the secure information to the user by displaying the secure information on a display provided in the secured module.

8. The transaction terminal control method according to claim 5, wherein the notifying includes notifying the secure information to the user by outputting the secure information as audio guidance from an audio output unit that is provided in the secured module.

* * * * *

UNITED STATES PATENT AND TRADEMARK OFFICE
CERTIFICATE OF CORRECTION

PATENT NO. : 7,513,421 B2
APPLICATION NO. : 11/826462
DATED : April 7, 2009
INVENTOR(S) : Tomoki Shibasaki It is certified that error appears in the above-identified patent and that said Letters Patent is hereby corrected as shown below:

On the Title Page, Item (63) (Related U.S. Application Data), Line 2, change "7,293,700." to --7,293,700, which is a continuation of PCT/JP2002/008316, filed on Aug. 16, 2002.--.

Column 1, Line 10, after "7,293,700," insert --which is a continuation of PCT/JP2002/008316, filed on Aug. 16, 2002,--.

Signed and Sealed this

Sixteenth Day of June, 2009

JOHN DOLL
*Acting Director of the United States Patent and Trademark Office*